United States Patent [19] [11] 4,101,571
Koenig et al. [45] Jul. 18, 1978

[54] MANUFACTURE OF SULFAMIC ACID HALIDES

[75] Inventors: Karl-Heinz Koenig, Frankenthal; Gerhard Hamprecht, Mannheim, both of Fed. Rep. of Germany

[73] Assignee: BASF Aktiengesellschaft, Ludwigshafen, Fed. Rep. of Germany

[21] Appl. No.: 665,684

[22] Filed: Mar. 10, 1976

[30] Foreign Application Priority Data

Mar. 29, 1975 [DE] Fed. Rep. of Germany ....... 2513997
Apr. 3, 1975 [DE] Fed. Rep. of Germany ....... 2514646

[51] Int. Cl.$^2$ ................. C07C 143/70; C07C 143/21; C07C 143/15
[52] U.S. Cl. ............................................. 260/543 R
[58] Field of Search ................................... 260/543 R

[56] References Cited

U.S. PATENT DOCUMENTS

| 3,795,705 | 3/1974 | Ohan | 260/543 R |
| 3,857,841 | 12/1974 | Keil | 260/543 R |
| 3,992,444 | 11/1976 | Hamprecht et al. | 260/543 R |

FOREIGN PATENT DOCUMENTS 2,164,176  6/1973  Fed. Rep. of Germany ... 260/543 R

Primary Examiner—Norman Morgenstern
Attorney, Agent, or Firm—Keil, Thompson & Shurtleff

[57] ABSTRACT

Sulfamic acid halides are produced by reaction of sulfamic acids with carbonic acid halides in the presence of carbamic acid halides or dichloromethyleneammonium chlorides. The products are starting materials for the manufacture of plant protection agents, dyes and pharmaceuticals.

13 Claims, No Drawings

MANUFACTURE OF SULFAMIC ACID HALIDES

The present invention relates to a process for the manufacture of sulfamic acid halides by reaction of sulfamic acids with carbonic acid halides in the presence of dichloromethyleneammonium chlorides or carbamic acid halides.

U.S. patent application Ser. No. 316,534 relates to a process for the manufacture of sulfamic acid halides of the formula

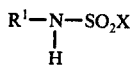
$$R^1-N-SO_2X \qquad \text{I}$$
$$\phantom{R^1-N}|$$
$$\phantom{R^1-N}H$$

where $R^1$ is an aliphatic or cycloaliphatic radical and X is halogen, by reaction of sulfamic acids of the formula

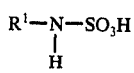
$$R^1-N-SO_3H \qquad \text{II}$$
$$\phantom{R^1-N}|$$
$$\phantom{R^1-N}H$$

where $R^1$ has the above meanings, or their metal salts, with an acid halide of sulfurous acid, phosphoric acid, phosphorous acid, carbonic acid or oxalic acid.

Virtually all the Examples are carried out with thionyl chloride, apart from one Example each with phosphorus pentachloride and phosgene respectively. Catalysts described are N,N-disubstituted carboxylic acid amides and tertiary amines, advantageously in an amount of from 0.25 to 1.6 per cent by weight, based on the acid chloride, and pyridine, dimethylformamide and γ-picoline are illustrated in the Examples.

It is an object of the present invention to provide a new process for producing sulfamic acid halides more simply and more economically in good yield and good purity, and specifically in better yield and purity than when using a carbonic acid halide as the acid chloride.

We have found that this object is achieved by a further development of the process of U.S. patent application Ser. No. 316,534, in which the starting materials II or their metal salts, instead of being reacted with the above acid halides, are reacted with an acid halide of carbonic acid in the presence of dichloromethyleneammonium chlorides of the formula

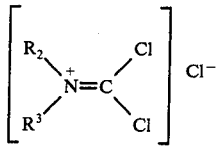

or in the presence of carbamic acid halides of the formula

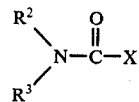

where $R^2$ and $R^3$ are identical or different and each is an aliphatic radical or $R^2$ and $R^3$ together with the adjacent nitrogen are members of a heterocyclic ring, and X is halogen.

We have further found that sulfamic acid halides of the formula I are obtained in an advantageous manner if, in a first stage, an isocyanate of the formula

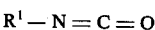
$$R^1-N=C=O \qquad \text{IV}$$

where $R^1$ has the above meanings, is reacted with sulfuric acid to give a sulfamic acid of the formula

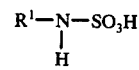
$$R^1-N-SO_3H \qquad \text{II}$$
$$\phantom{R^1-N}|$$
$$\phantom{R^1-N}H$$

where $R^1$ has the above meanings, and thereafter, in a second stage, the product II or its metal salt is reacted with an acid halide of carbonic acid in the presence of dichloromethyleneammonium chlorides of the formula

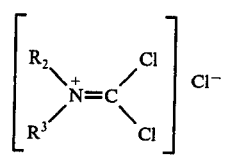

or in the presence of carbamic acid halides of the formula

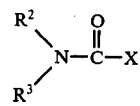

where $R^2$ and $R^3$ are identical or different and each is an aliphatic radical, or $R^2$ and $R_3$ together with the adjacent nitrogen are members of a heterocyclic ring, and X is halogen, to give the end product I.

Where ethylsulfamic acid and phosgene are used, this reaction can be represented by the equation:

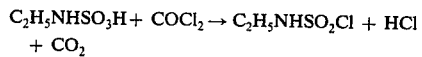
$$C_2H_5NHSO_3H + COCl_2 \rightarrow C_2H_5NHSO_2Cl + HCl + CO_2$$

Compared to the process of German Published Application No. 2,164,176, the process of the invention gives sulfamic acid halides more simply and more economically, in good yield and purity and, compared to the previous use of carbonic acid halides as acid chlorides, in improved yield and purity. Phosgene, which is generally used, is more economical to employ than the other conventional acid halides and produces less pollution of the environment, since only carbon dioxide and hydrogen chloride are produced as the off-gas from the reaction, in that case. However, in German Published Application No. 2,164,176 yields of only up to 44.5% of theory are achievable with this acid halide. The fact that the yield of end product is increased substantially using catalysts III and IIIa of the invention was unexpected from a knowledge of the efficiency of phosgenation catalysts. Equally, it is advantageous that the catalysts IIIa according to the invention can easily be isolated by distillation from the reaction mixture, or in the course of isolating the end product I, and can be re-used, whilst the conventional catalysts, where these are salts, are lost in the distillation residue. All these advantageous results are therefore surprising in the light of the prior art.

Preferred starting materials II and IV and, accordingly, preferred end products I are those where R is straight-chain or branched alkyl of 1 to 20 carbon atoms, especially of 1 to 8 carbon atoms, or alkyl of 2 to 20 carbon atoms, especially 2 to 8 carbon atoms, and advantageously 2 to 6 carbon atoms, which is substituted by 3, 2 or especially one alkoxy of 1 to 7 carbon atoms, especially 1 to 3 carbon atoms, or is cycloalkyl of 4 to 8 carbon atoms, and X is bromine or, in general, preferably chlorine. The radicals mentioned may be further substituted by groups and/or atoms which are inert under the reaction conditions, eg., chlorine, bromine, alkyl and alkoxy each of 1 to 4 carbon atoms, carbalkoxy of 2 to 4 carbon atoms or cycloalkyl of 4 to 6 carbon atoms. Preferred starting materials II and IV and end products I are especially those where R is cyclopentyl, n-hexyl, cyclohexyl, cycloheptyl, cyclobutyl, cyclooctyl, alkyl of 2 to 5 carbon atoms which is substituted by chlorine, bromine or cycloalkyl of 4 to 6 carbon atoms, branched alkyl of 3 to 7 carbon atoms, 1-methyl-1-propyl, hexyl-(3), heptyl-(4), β-methoxyisopropyl, or alkyl of 2 to 20 carbon atoms, especially 2 to 8 carbon atoms and advantageously 2 to 6 carbon atoms, which is substituted by 3, 2 or especially one alkoxy of 1 to 7, especially 1 to 3 carbon atoms, and X is bromine or, in general, chlorine.

Examples of appropriate sulfamic acids II are methylsulfamic acid, ethylulfamic acid, n-propylsulfamic acid, isopropylsulfamic acid, n-butylsulfamic acid, isobutylsulfamic acid, sec.-butylsulfamid acid, cyclobutylsulfamic acid, 1-ethyl-1-propylsulfamic acid, 1,2-dimethyl-1-propylsulfamic acid, n-pentylsulfamic acid, cyclopentylsulfamic acid, n-hexylsulfamic acid, hexyl-(3)-sulfamic acid, cyclohexylsulfamic acid, cycloheptylsulfamic acid, heptyl-(4)-sulfamic acid, cyclooctylsulfamic acid, 2-methyl-1-ethyl-1-propylsulfamic acid, 1,2,2,-trimethyl-1-propylsulfamic acid 1,3-dimethyl-1-n-butylsulfamic acid, 1,2-dimethyl-1-n-butylsulfamic acid, 1,2-dimethyl-1-n-hexylsulfamic acid, 1-cyclohexyl-1-ethylsulfamic acid, 2-chloroisopropylsulfamic acid, 2-chloropropylsulfamic acid, 3-chloropropylsulfamic acid, 3-bromopropylsulfamic acid and 1-chloromethyl-1-propylsulfamic acid; tert.-butyl-, pentyl-(2)-, n-heptyl, n-octyl-, n-nonyl-, n-decyl-, 2-ethylhexyl-, 2-ethylpentyl-, 3-ethylpentyl-, 2,3-dimethyl-n-butyl-, 2-methylpentyl-, 3-methylpentyl-, 2-methylheptyl-, 3-methylheptyl-, 4-methylheptyl-, 3-ethylhexyl-, 2,3-dimethylhexyl-, 2,4-dimethylhexyl-, 2,5-dimethylhexyl-, undecyl-, dodecyl-, tridecyl-, tetradecyl-, pentadecyl-, hexadecyl-, heptadecyl-, octadecyl-, nonadecyl- and eicosyl-sulfamic acid; the ω-methoxy, ω-ethoxy, ω-n-propoxy, ω-isopropoxy, ω-n-butoxy, ω-isobutoxy, ω-sec.-butoxy, ω-tert.-butoxy, ω-pentoxy, ω-pentoxy-(2), ω-pentoxy-(3), ω-n-hexoxy and ω-n-heptoxy derivatives of ethyl-, n-propyl-, isopropyl-, n-butyl-, isobutyl-, sec.-butyl-, tert.-butyl-, pentyl-, pentyl-(2), pentyl-(3), n-hexyl-, n-heptyl-, n-octyl-, n-nonyl-, n-decyl-, 2-ethylhexyl-, 2-ethylpentyl-, 3-ethylpentyl-, 2,3-dimethyl-n-butyl-, 2-methylpentyl-, 3-methylpentyl-, 2-methylheptyl-, 3-methylheptyl, 4-methylheptyl-, 3-ethylhexyl-, 2,3-dimethylhexyl-, 2,4-dimethylhexyl-, 2,5-dimethylhexyl-, undecyl-, dodecyl-, tridecyl-, tetradecyl-, pentadecyl-, hexadecyl-, heptadecyl-, octadecal-, nonadecyl- and eicosylsulfamic acid; corresponding methyl, ethyl, n-propyl, isopropyl, n-butyl, isobutyl, sec.-butyl, tert.-butyl, pentyl, pentyl-(2)-, pentyl-(3)-, n-hexyl and n-heptyl ethers of n-propyl-, isopropyl-, n-butyl-, isobutyl-, sec.-butyl-, tert.-butyl, pentyl-, pentl-(2)-, pentyl-(3)-, n-hexyl-, n-heptyl-, n-octyl-, n-nonyl-, n-decyl-, 2-ethylhexyl-, 2-ethylpentyl-, 3-ethylpentyl-, 2,3-dimethyl-n-butyl-, 2-methylpentyl-, 3-methylpentyl-, 2-methylheptyl-, 3-methylheptyl-, 4-methylheptyl-, 3-ethylhexyl-, 2,3-dimethylhexyl-, 2,4-dimethylhexyl-, 2,5-dimethylhexyl-, undecyl-, dodecyl-, tridecyl-, tetradecyl-, pentadecyl-, hexadecyl-, heptadecyl-, octadecyl-, nonadecyl- and eicosyl-sulfamic acid, the ether link being in the 1- or 2-position of the said acids, and of ethylsulfamic acid, the ether link being in the 1-position thereof.

The starting materials II can be used in the form of sulfamic acids, preferably of the sulfamic acids, free from sulfuric acid, which have been manufactured by the process described in German Published Application No. 2,164,197, or of their metal salts. Preferred metal salts are the alkali metal salts or alkaline earth metal salts, eg. magnesium, calcium, lithium, potassium and especially sodium sulfamates. The starting materials II can be reacted with a stoichiometric amount or an excess of the acid halide, the preferred ratio being from 1.1 to 2 moles of acid halide per mole of starting material II. Suitable acid halides are carbonic acid dibromide and phosgene, which in general is the advantageous compound to use.

The reaction is as a rule carried out at from 10° to 120° C, especially from 60° to 100° C, under atmospheric or superatmospheric pressure, continuously or batchwise. Advantageous catalysts to use are dichloromethyleneammonium chlorides III or carbamic acid halides IIIa, where $R^2$ and $R^3$ may be identical or different and each is alkyl or chloroalkyl, in each case of 1 to 6 carbon atoms, or $R^2$ and $R^3$ together with the adjacent nitrogen are members of a 5-membered or 6-membered heterocyclic ring which may contain a further nitrogen or an oxygen, and X is chlorine. The said advantageous radicals and rings may be further substituted by groups and/or atoms which are inert under the reaction conditions, eg. alkyl or alkoxy each of 1 to 4 carbon atoms. In general, from 10 to 30, preferably from 15 to 25, per cent by weight of catalyst III, based on starting material II, are used. In general, from 5 to 30, preferably from 10 to 20, % by weight of catalyst IIIa, based on starting material II, is used if IIIa is solely present as a catalyst. Since, however, it can be recovered, it can advantageously also serve as the reaction medium, in which case amounts of from 30 to 500, preferably from 200 to 300, % by weight of carbamic acid halide IIIa, based on starting material II, may be used. In place of the catalyst IIIa, it is also possible to use the amines from which the catalysts are formed, eg. dimethylamine, since these, eg., react in the presence of phosgene, under the reaction conditions, to give carbamic acid chlorides IIIa, eg. dimethylcarbamic acid chloride.

The catalysts III may be prepared, eg., in accordance with the processes described in Angew. Chem., 85 (1973), 837-839, eg. by chlorination of N-substituted thiocarbamoyl chlorides, such as N,N-dimethylthiocarbamoyl chloride, or corresponding dithiurams, or by reaction of substituted dithiocarbamic acid esters with thionyl chloride.

It is preferred to use dichloromethylenedimethylammonium chloride, dichloromethylenediethylammonium chloride, dichloromethylene-di-n-propylammonium chloride, dichloromethylenediisopropylammonium chloride, dichloromethylene-di-n-butyl ammonium chloride, dichloromethylene-di-sec.-butyl-ammonium chloride, dichloromethylenediisobutylammonium chloride, dichloromethylene-bis-(β-chloroethyl)-ammonium chloride, dichloromethylenemethylethyl-ammonium chloride, dichloromethylenemethyl-propyl-ammonium chloride, dichloromethylenepyrrolidinium chloride, dichloromethylene-piperidinium chloride and dichloromethylene-morpholinium chloride. Where appropriate, the following catalysts III, or mixtures of catalysts III, may also be used: di-(tert.-butyl)-, di-(pentyl)- di-(pentyl)-2-, di-(pentyl)-(3)-, di-(n-hexyl)-, di-(n-heptyl)-, di-(n-octyl)-, di-(2-ethylhexyl)-, di-(2,2,6-trimethyl-n-pentyl)-, di-(2-ethylpentyl)-, di-(3-ethylpentyl)-, di-(2,3-dimethyl-n-butyl)-, di-(2,2-dimethyl-n-butyl)-, di-(2-methylpentyl)-, di-(3-methylpentyl)-, di-(2,2,4-trimethylpentyl)-, di-(2-methylheptyl)-, di-(3-methylheptyl)-, di-(4-methylheptyl)-, di-(3-ethylhexyl)-, di-(2,2-dimethylhexyl)-, di-(2,3-dimethylhexyl)-, di-(2,4-dimethylhexyl), di-(2,5-dimethylhexyl)-, di-(3,3-dimethylhexyl)-, di-(3,4-dimethylhexyl)-, di-(2-methyl-3-ethylpentyl)-, di-(3-methyl-3-ethylpentyl)-, di-(2,2,3-trimethylpentyl)-, di-(2,2,4-trimethylpentyl)-, di-(2,3,3-trimethylpentyl)-, di-(2,3,4-trimethylpentyl)-, di-(2,2,3,3-tetramethylbutyl)-, methyl-isopropyl-, methyl-n-butyl-, methyl-isobutyl-, methyl-sec.-butyl-, methyl-tert.-butyl- and methyl-pentyl-dichloromethyleneammonium chloride; corresponding dialkyldichloromethylene-ammonium chlorides substituted by a chlorine atom at the carbon atom in the 2-position or ω-position of each alkyl group; and oxaziridino-, azetidino-, 2-azetino-, Δ²-pyrrolino-, Δ³-pyrrolino-, pyrrolo-, imidazolo-, imidazolidino-, 3-imidazolino-, 2H-1,2-oxazino-, piperazino- and 1H-azepino-dichloromethylene-ammonium chlorides.

Preferred catalysts IIIa are dimethylcarbamic acid chloride, diethylcarbamic acid chloride, di-n-propylcarbamic acid chloride, diisopropylcarbamic acid chloride, di-n-butyl-carbamic acid chloride, diisobutylcarbamic acid chloride, di-sec.-butylcarbamic acid chloride, di-n-pentylcarbamic acid chloride, pyrrolidinocarbamic acid chloride, morpholinocarbamic acid chloride, piperidinocarbamic acid chloride, methylethylcarbamic acid chloride, methylpropylcarbamic acid chloride, methylbutylcarbamic acid chloride, ethylpropylcarbamic acid chloride, methylchloromethylcarbamic acid chloride and bis-chloromethylcarbamic acid chloride. Where appropriate, the following catalysts IIIa and mixtures of catalysts IIIa can also be used: di-(tert.-butyl)-, di-(pentyl)-(2)-, di-(pentyl)-(3)-, di-(n-hexyl)-, di-(n-heptyl)-, di-(n-octyl)-, di-(2-ethylhexyl)-, di-(2,2,6-trimethyl-n-pentyl)-, di-(2-ethylpentyl)-, di-(3-ethylpentyl)-, di-(2,3-dimethyl-n-butyl)-, -di-2,2-dimethyl-n-butyl)-, di-(2-methylpentyl)- di-(3-methypentyl)-, di-(2,2,4-trimethypentyl)-, di-(2-methylheptyl)-, di-(3-methylheptyl)-, di-(4-methylheptyl)-, di-(3-ethylhexyl)-, di-(2,2-dimethylhexyl)-, di-(2,3-dimethylhexyl)-, di-(2,4-dimethylhexyl)- di-(2,5-dimethylhexyl)-, di-(3,3-dimethyl-hexyl)- di-(3,4-dimethylhexyl)-, di-(2-methyl-3-ethylpentyl)-, di-(3-methyl-3-ethylpentyl)-, di-(2,2,3-trimethylpentyl)-, di-(2,3,3-trimethylpentyl)-, di-(2,3,4-trimethylpentyl)-, di-(2,2,3,3-tetramethylbutyl)-, methyl-isopropyl-, methyl-isobutyl-, methyl-sec.-butyl-, methyl-tert.-butyl- and methyl-pentyl-carbamic acid chloride; corresponding dialkylcarbamic acid chlorides substituted by a chlorine atom at the carbon atom in the 2-position or ω-position of each alkyl group; and oxaziridino-, azetidino-, 2-azetino-, Δ²- pyrrolino-, Δ³-pyrrolino-, pyrrolo-, imidazolo-, imidazolidino-, 3-imidazolino-, 2H-1,2-oxazino-, piperazino- and 1H-azepino-carbamic acid chloride.

The reaction is suitably carried out in an initially introduced quantity of the end product I itself as the solvent, or in an organic solvent which is inert under the reaction conditions. Particularly suitable solvents are chlorinated aliphatic hydrocarbons, eg. methylene chloride, chloroform, carbon tetrachloride, 1,1- and 1,2-dichloroethane, 1,1,1- and 1,1,2-trichloroethane, 1,1,2,2-trichloroethane, 1,1,2,2- and 1,1,1,2-tetrachloroethane, n-propyl chloride, n-butyl chloride, sec.-butyl chloride, isobutyl chloride, 1,4-dibromobutane and 1,10-di-bromodecane; chlorinated aromatic hydrocarbons, eg. chlorobenzene, bromobenzene, iodobenzene, o-dichlorobenzene, m-dichlorobenzene, o-dibromobenzene, m-dibromobenzene, o-, m- and p-chlorotoluene and 1,2,4-trichlorobenzene, and nitrohydrocarbons, eg. nitrobenzene, nitromethane, nitroethane and o-, m- and p-chloronitrobenzene; nitriles such as benzonitrile and m-chlorobenzonitrile; aliphatic and cycloaliphatic hydrocarbons, eg. hexane, petroleum ether, cyclohexane, pentane and heptane; and corresponding mixtures. In general, the solvent, or the initially introduced end product I, is used in amounts of from 0 to 600 per cent by weight, advantageously from 50 to 600 per cent by weight, based on starting material II. Equally, it is possible advantageously to use the catalyst IIIa as the solvent, if appropriate mixed with the above solvents and/or the initially introduced end product I.

The reaction may be carried out as follows: a mixture of starting material II, catalyst III or IIIa and acid halide, if appropriate together with solvent, is kept at the reaction temperature for from 3 to 16 hours. It is possible to saturate the mixture of catalyst III or IIIa and solvent with phosgene and then to add the sulfamic acid II. Equally, it is possible first to mix the sulfamic acid II, the catalyst III or IIIa and the solvent and then to add phosgene. The end product I is isolated from the reaction mixture by conventional methods, eg. by fractional distillation. In many cases it is merely necessary to remove the solvent and the catalyst IIIa from the mixture, since the end product left as the residue is sufficiently pure, even without distillation, to be usable in numerous syntheses.

In an advantageous embodiment, the reaction mixture from the manufacture of the starting material II is used, without isolation of the latter, as the starting mixture for the process according to the invention, if appropriate after addition of solvent. A preferred starting mixture is the reaction mixture described in German Published Application No. 2,164,197. This mixture is obtained on reaction of an isocyanate with anhydrous sulfuric acid at not less than 25° C in an inert solvent, eg. in one of the above solvents. The following method is preferred: a mixture of starting material IV and solvent, on the other hand, and sulfuric acid, or a mixture of sulfuric acid and solvent, on the other, are added simultaneously but separately to an initial amount of solvent, whilst stirring vigorously. The addition advantageously requires from 10 to 55 minutes and is frequently made at from 25° to 50° C, after which the reaction is carried out at not less than 50° C. It is advantageous to use, as the solvent, the same solvent as that used for the process according to the invention. The catalyst is now added, as well as a further quantity of solvent, if appropriate, and the reaction according to the invention is carried out as a second stage, over 3 to 16 hours. If appropriate, the reaction temperature is varied within the above temperature range, eg. is raised to from 60° to 100° C, advantageously from 80° to 100° C. The end product I is isolated in the manner described above.

The compounds which may be manufactured by the process of the invention are valuable starting materials for the manufacture of plant protection agents, dyes and pharmaceuticals. Thus, eg., the o-sulfamidobenzoic acids described in German Published Application No. 2,104,682 may be manufactured from them by reaction with anthranilic acid or its salts. Cyclization of these compounds, eg. by the process described in German Published Application No. 2,105,687, gives the 2,1,3-benzothiadiazin-4-one-2,2-dioxides, the use of which for plant protection agents and pharmaceuticals is described in the patent application. The very good herbicidal properties of this category of compounds are described in U.S. Pat. No. 3,621,017, German Pat. No. 1,937,551 and German Published Application No. 2,131,401.

Their use as intermediates for herbicides is furthermore dealt with in German Pat. No. 1,542,836 and German Published Application . ... ... (Patent Application P 23 49 114.7); furthermore, reaction of alkylaminosulfonyl chlorides with sulfenyl chlorides by the process of German Patent No. 1,953,356 gives intermediates for fungicides.

Reaction of the end products I with substituted glycolic acid anilides gives further herbicides (German Published Application No. 2,201,432 and German Published Application No. 2,310,757).

Finally, the 2,1,3-benzothiadiazin(4)one-2,2-dioxides obtainable from N-alkylaminosulfonyl chlorides have valuable pharmacological properties. Thus, U.S. Pat. No. 3,041,336 discloses that 3-oxo-1,2,6-thiadiazine-1,1-dioxides may be used as antiphlogistics, antipyretics and analgesics. The end products I mentioned above as being preferred are particularly suitable in this connection.

In the Examples, parts are by weight.

EXAMPLE 1

69.5 parts of isopropylsulfamic acid and 15 parts of dichloromethylenedimethylammonium chloride are suspended in 370 parts of 1,2-dichloroethane at 20° C and warmed to 83° C whilst passing phosgene into the mixture. A total of 200 parts of phosgene is introduced in the course of 12 hours, whilst stirring. After removing excess phosgene, and the solvent, under reduced pressure, the residue is distilled giving 55.2 parts of isopropylsulfamic acid chloride (70% of theory), of boiling point 66–69° C/0.01 mm Hg and $n_D^{25} = 1.4548$.

EXAMPLE 2

42.5 parts of isopropyl isocyanate and 49.5 parts of oleum (1 per cent by weight of $SO_3$) are introduced simultaneously but separately, through 2 inlets, into 280 parts of 1,2-dichloroethane at from 25° to 35° C, in the course of 20 minutes, whilst stirring. The reaction mixture is stirred for 15 minutes at 83° C, until the evolution of gas has ceased, and 15 parts of dichloromethylenedimethylammonium chloride are added whilst passing phosgene into the mixture. In the course of 12 hours, a total of 260 parts of phosgene are introduced at 83° C. After removing the solvent and excess phosgene under reduced pressure, 54.3 parts (69% of theory) of isopropylsulfamic acid chloride of boiling point 65°–75° C/0.1 mm Hg and $n_D^{25} = 1.4550$ are obtained by distilling the residue.

EXAMPLE 3

15 parts of dichloromethylenedimethylammonium chloride, suspended in 540 parts of 1,2-dichloroethane, are saturated with 40 parts of phosgene at 35° C, whilst stirring. 89.6 parts of cyclohexylsulfamic acid are now added and a further 550 parts of phosgene are then introduced in the course of 15 hours at 83° C, whilst stirring. After removing excess phosgene, and the solvent, under reduced pressure, 67.2 parts (68% of theory) of cyclohexylsulfamic acid chloride of boiling point 100°–114° C/0.01 mm Hg and melting point 43°–47° C are obtained by distillation of the residue.

EXAMPLES 4 to 6

The following compounds are obtained by the method described in Example 2:

| Example | Parts | Starting material R—N=C=O | Parts | % of theory | End product RNHSO$_2$Cl | Boiling point | $n_D^{25}$ |
|---|---|---|---|---|---|---|---|
| 4 | 49.5 | $(CH_3)_2CH$—$CH_2$—N=C=O | 52.3 | 61 | $(CH_3)_2CH$—$CH_2NHSO_2Cl$ | 90–92° C/ 0.01 mm Hg | 1.4579 |
| 5 | 66.8 | $C_2H_5$\ CH—N=C=O / Cl—$CH_2$ | 45.5 | 44 | $C_2H_5$\ CH—NHSO$_2$Cl / Cl—$CH_2$ | 89–106° C/ 0.01 mm Hg | 1.4869 |
| 6 | 55.5 | [H]—N=C=O | 51.3 | 56 | [H]—NHSO$_2$Cl | 107–117° C/ 0.1 mm Hg | 1.4949 |

EXAMPLE 7

30 parts of phosgene are introduced into a solution of 15 parts of dimethylcarbamic acid chloride in 310 parts of 1,2-dichloroethane at 20° C, until the solution is saturated. 69.5 parts of isopropylsulfamic acid are now added and 200 parts of phosgene are introduced in the course of 11 hours, whilst stirring and raising the reaction temperature to 83° C. The resulting clear solution is concentrated on a rotary evaporator and the residue is distilled through a packed column. 55.2 parts (70% of theory) of isopropylsulfamic acid chloride of boiling point 68°–72° C/0.04 mm Hg and $n_D^{25} = 1.4540$ are obtained.

EXAMPLE 8

54 parts of dimethylcarbamic acid chloride are introduced into a suspension of 69.5 parts of isopropylsulfamic acid in 310 parts of 1,2-dichloroethane at room temperature, whilst stirring. The reaction mixture is heated to 83° C and 250 parts of phosgene are added in the course of 13 hours. After concentrating the mixture on a rotary evaporator, distillation of the residue gives 49.6 parts (63% of theory) of isopropylsulfamic acid chloride of boiling point 67°–72° C/0.04 mm Hg.

EXAMPLE 9

42.5 parts of isopropyl isocyanate and 49.5 parts of oleum (1 per cent by weight of $SO_3$) are introduced simultaneously, through 2 inlets, into 280 parts of 1,2-dichloroethane, in the course of 20 minutes, whilst stirring. The reaction mixture is stirred for 15 minutes at 83° C, until the evolution of gas has ceased, and 15 parts of dimethylcarbamic acid chloride are then added whilst passing phosgene into the mixture. In total, 270 parts of phosgene are introduced in the course of 13 hours at 83° C. After removing the solvent and the dimethylcarbamoyl chloride, 52.6 parts (67% of theory) of isopropylsulfamic acid chloride of boiling point 64°–69° C/0.01 mm Hg and $n_D^{25} = 1.4521$ are obtained by distillation.

EXAMPLE 10

A solution of 15 parts of dimethylcarbamic acid chloride in 310 parts of 1,2-dichloroethane is saturated with 30 parts of phosgene at 25° C and 89.5 parts of cyclohexylsulfamic acid are then added. The reaction mixture is heated to 83° C whilst continuing to introduce phosgene. In total, 330 parts of phosgene are introduced in the course of 13 hours. After removing the solvent and the dimethylcarbamic acid chloride under reduced pressure, the residue is distilled, and 57 parts (58% of theory) of cyclohexylsulfamic acid chloride of boiling point 208°–127° C/0.1 mm Hg and melting point 42°–44° C are obtained.

EXAMPLES 11 TO 13

The compounds shown in the Table are obtained by the method of Example 10.

TABLE

| Example | Parts | Starting material RNHSO$_3$H R | Parts of end product | % of theory | Boiling point (° C) | $n_D^{25}$ |
|---|---|---|---|---|---|---|
| 11 | 76.6 | n-C$_4$H$_9$— | 43.6 | 51 | 91–96/0,2 | 1.4619 |
| 12 | 91 | C$_2$H$_5$\<br>      CH—$^{a)}$<br>n-C$_3$H$_7$ | 40.9 | 41 | 130/0.1$^{c)}$ | 1.4628 |
| 13 | 97,6 | n-C$_3$H$_7$\<br>      CH—$^{b)}$<br>n-C$_3$H$_7$ | 40.5 | 38 | 160/0.1$^{c)}$ | 1.4625 |

$^{a)}$ $n_D^{25} = 1.4690$
$^{b)}$ $n_D^{25} = 1.4660$ (prepared according to German Published Application 2,164,197)
$^{c)}$ Bath temperature of the thin film evaporator

EXAMPLE 14

(a) 69.5 parts of isopropylsulfamic acid are introduced in the course of 1½ hours, at 100° C, into 175 parts of dimethylcarbamic acid chloride saturated with phosgene, whilst stirring. The reaction mixture is stirred for a further 3¼ hours at 100° C whilst introducing a total of 280 parts of phosgene. After removing the solvent and the dimethylcarbamic acid chloride under reduced pressure, distillation of the residue gives 55.3 parts (70% of theory) of isopropylsulfamic acid chloride of boiling point 70°–76° C/0.1 mm Hg and $n_D^{25} = 1.4525$.

(b) Analogously to Example 14a), but using 64.4 parts of the sodium salt of isopropylsulfamic acid, 29.6 parts (47% of theory) of isopropylsulfamic acid chloride of boiling point 70°–76° C/0.1 mm Hg are obtained after 8 hours' phosgenation.

(c) Analogously to Example 14a), but using 175 parts of diethylcarbamic acid chloride, 52 parts (66% of theory) of isopropylsulfamic acid chloride of boiling point 70°–76° C/0.1 mm Hg are obtained after 4 hours' phosgenation.

We claim:
1. A process for the manufacture of sulfamic acid chlorides of the formula

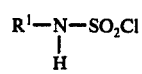

$$R^1\!-\!\underset{\underset{H}{|}}{N}\!-\!SO_2Cl \qquad \text{I}$$

where $R^1$ is an aliphatic or cycloaliphatic radical which comprises: reacting sulfamic acids of the formula

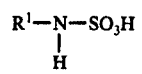

$$R^1\!-\!\underset{\underset{H}{|}}{N}\!-\!SO_3H \qquad \text{II}$$

where $R^1$ has the above meanings, or their metal salts, with phosgene in the presence of dichloromethyleneammonium chlorides of the formula

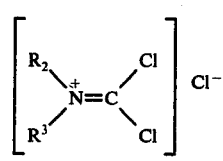

$$\left[\begin{array}{c} R^2 \\\ \phantom{a} \searrow\!\!\!\overset{+}{N}\!=\!C\!\!\!\nearrow^{Cl} \\\ R^3\nearrow \phantom{aa} \searrow_{Cl} \end{array}\right] Cl^- \qquad \text{III}$$

or in the presence of carbamic acid halides of the formula

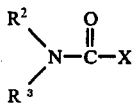

$$\underset{R^3}{\overset{R^2}{\searrow}}N\!-\!\overset{\overset{O}{\|}}{C}\!-\!X \qquad \text{IIIa}$$

where $R^2$ and $R^3$ may be identical or different and each is an aliphatic radical, or $R^2$ and $R^3$ together with the adjacent nitrogen are members of a heterocyclic ring, and X is halogen.

2. A process as claimed in claim 1, wherein, in a first stage, an isocyanate of the formula

$$R^1 - N = C = O \qquad \text{IV}$$

where $R^1$ has the above meanings, is reacted with sulfuric acid to give a sulfamic acid of the formula

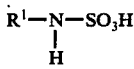

where $R^1$ has the above meanings, and thereafter, in a second stage, the product II or its metal salt is reacted with phosgene in the presence of dichloromethyleneammonium chlorides of the formula

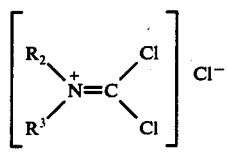

or in the presence of carbamic acid halides of the formula

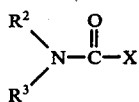

where $R^2$ and $R^3$ are identical or different and each is an aliphatic radical, or $R^2$ and $R^3$ together with the adjacent nitrogen are members of a heterocyclic ring, and X is halogen, to give the end product I.

3. A process as claimed in claim 1, wherein the reaction is carried out with magnesium, calcium, lithium, potassium or sodium salts of the sulfamic acid as starting materials II.

4. A process as claimed in claim 1, wherein the reaction is carried out at from 10° to 120° C.

5. A process as claimed in claim 1, wherein the reaction is carried out at from 60° to 100° C.

6. A process as claimed in claim 1, wherein the reaction is carried out with a ratio of from 1.1 to 2 moles of phosgene per mole of starting material II.

7. A process as claimed in claim 1, wherein the reaction is carried out with dichloromethyleneammonium chlorides III, where $R^2$ and $R^3$ may be identical or different and each is alkyl or chloroalkyl, in each case of 1 to 6 carbon atoms, or $R^2$ and $R^3$ together with the adjacent nitrogen are members of a 5-membered or 6-membered heterocyclic ring which may contain a further nitrogen or an oxygen, and the radicals and rings may be further substituted by alkyl or alkoxy, each of 1 to 4 carbon atoms, or by chlorine.

8. A process as claimed in claim 1, wherein the reaction is carried out with carbamic acid halides IIIa, where $R^2$ and $R^3$ may be identical or different and each is alkyl or chloroalkyl, in each case of 1 to 6 carbon atoms, or $R^2$ and $R^3$ together with the adjacent nitrogen are members of a 5-membered or 6-membered heterocyclic ring which may contain a further nitrogen or an oxygen, and the radicals and rings may be further substituted by alkyl or alkoxy, each of 1 to 4 carbon atoms, or by chlorine.

9. A process as claimed in claim 1, wherein the reaction is carried out with from 5 to 30% by weight of catalyst IIIa, based on starting material II.

10. A process as claimed in claim 1, wherein the reaction is carried out with from 10 to 30% by weight of catalyst III, based on starting material II.

11. A process as claimed in claim 1, wherein the reaction is carried out with from 30 to 500% by weight of carbamic acid halide IIIa, based on starting material II.

12. A process as claimed in claim 1, wherein the reaction is carried out in an organic solvent which is inert under the reaction conditions.

13. A process as claimed in claim 1 wherein $R^1$ is straight- or branched-chain alkyl of 1 to 20 carbon atoms, alkyl of 2 to 20 carbon atoms which is substituted by 3, 2 or 1 alkoxy of 1 to 7 carbon atoms or cycloalkyl of 4 to 8 carbon atoms, and the radicals and rings may be further substituted by chlorine, bromine, alkyl and alkoxy each of 1 to 4 carbon atoms, carbalkoxy of 2 to 4 carbon atoms or cycloalkyl to 4 to 6 carbon atoms.

* * * * *